Sept. 12, 1933.  A. C. GILBERT  1,926,441
ELECTRIC MOTOR
Filed Jan. 20, 1931

Inventor
Alfred C. Gilbert.
By Rockwell & Bartholow
Attorneys

Patented Sept. 12, 1933

1,926,441

UNITED STATES PATENT OFFICE 1,926,441

ELECTRIC MOTOR

Alfred C. Gilbert, North Haven, Conn., assignor to The A. C. Gilbert Company, New Haven, Conn., a corporation of Maryland Application January 20, 1931. Serial No. 509,983

15 Claims. (Cl. 172—36)

This invention relates to electric motors and especially to electric motors of small size that may be used in connection with the driving of electric fans, hand drills, small speed lathes, juice extractors, mixers or beaters and the like which require only a moderate amount of power.

The invention is particularly concerned with the construction, mounting and arrangement of the parts constituting the motor and especially with reference to the supporting means for the armature and casing, and to an improved form of brush holder for use therewith.

One object of my invention is to provide a generally improved electric motor that will be inexpensive to manufacture and efficient in use.

Another object is to provide an improved supporting means or frame for the armature and field of the motor, whereby they will be disposed and retained in proper position relatively to each other for efficient operation.

Still another object is to improve motors of this type by providing a casing about the armature and field thereof, which may be supported by the improved supporting frame and will enclose the parts supported thereby while being spaced therefrom to permit the desired circulation of air thereabout.

A further object of this invention is to provide an internal framework for an enclosed motor, which will efficiently and rigidly dispose and retain the field core, armature, brushes and an enclosing casing in proper position in respect to each other, and will readily permit the removal of the casing to expose the parts enclosed thereby for inspection or repair without disturbing these parts from their operative positions.

A still further object of this invention is to provide an improved brush holder for a motor requiring the same, which is inexpensive to manufacture and efficient in use and in which the brush and other parts may be readily adjusted or replaced.

To these and other ends, the invention consists in the novel features and combinations of parts to be hereinafter described and claimed.

Figure 1:
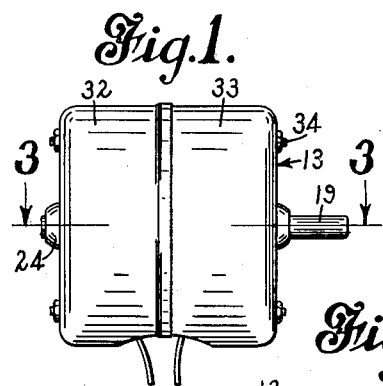
Fig. 1 is a side view of an electric motor, embodying the features of this invention.
Figure 2:
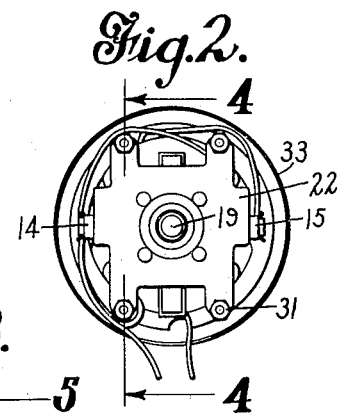
Fig. 2 is an end view of the motor shown in Fig. 1, with a portion of the casing removed.
Figure 3:
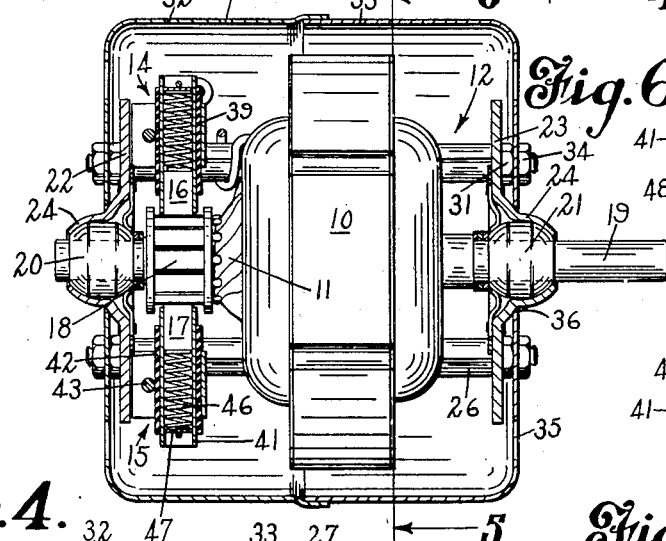
Fig. 3 is an enlarged section on line 3—3 of Fig. 1.
Figure 6:
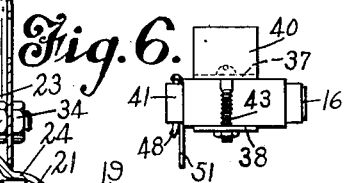
Fig. 6 is a section on line 6—6 of Fig. 4.
Figure 7:
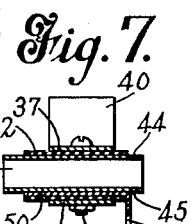
Fig. 7 is a section through the brush holder on line 7—7 of Fig. 4, the brush being omitted for the sake of clearness.
Figure 4:
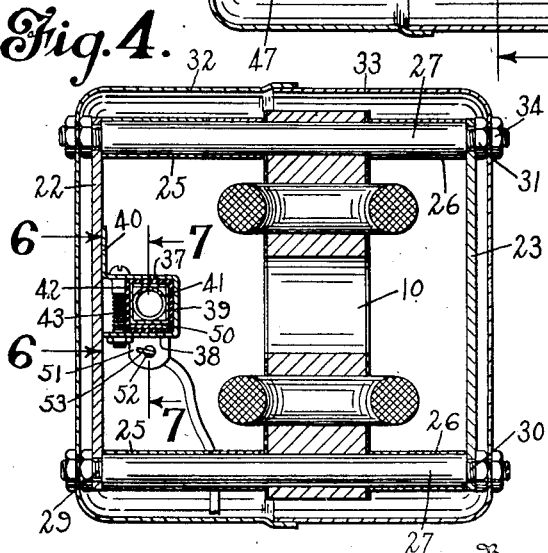
Fig. 4 is an enlarged section on line 4—4 of Fig. 2.
Figure 5:
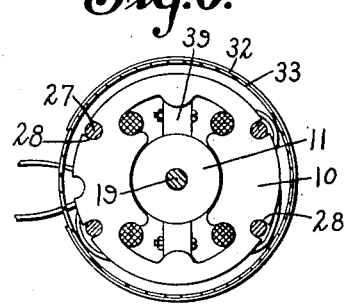
Fig. 5 is a section on line 5—5 of Fig. 3.

The motor shown in the drawing generally comprises a field core 10, an armature or rotor 11 suitably supported in respect to the field core 10 by a supporting structure or frame 12 and a casing 13. In this instance, a motor of the type requiring a commutator is shown and, therefore, suitable brush holders 14 and 15 are provided and are associated with a part of the frame 12. The brush holders are adapted to receive brushes 16 and 17 that are operatively associated with a commutator 18.

The field core 10 is in the form of a ring, the center opening of which is adapted to receive the armature or rotor 11, a shaft 19 of which is journaled in bearing bushings 20 and 21. The bearing bushings 20 and 21 are supported by plates 22 and 23 respectively, within a hollow boss 24, formed in each plate. The plates 22 and 23 are disposed one on either side of the field core 10, and spaced from the respective sides thereof by spacing sleeves 25 and 26 respectively.

A plurality of rods 27, in this instance four, extend between plates 22 and 23 with their ends in abutment therewith. Each of rods 27 passes through a sleeve 25, is disposed in one of a plurality of grooves 28, provided in the periphery of the field core 10 and then through a sleeve 26. Each rod 27 is provided with threaded extensions 29 and 30, one at each end thereof. The extensions 29 and 30 are smaller in diameter than rods 27 and pass through openings in the corners of plates 22 and 23 respectively, extending beyond each plate so as to receive a nut 31 by which the plates are clamped against the ends of rods 27.

The casing 13 is formed by two cup-shaped sheet metal portions 32 and 33, which are adapted to telescope one within the other, portion 32, in this instance, being enlarged in diameter at its open end to receive the open end of portion 33. The end face of each casing portion is provided with perforations, each being adapted to receive one of the extensions 29 or 30. The rod extensions 29 or 30 extend through the casing portion associated therewith, and a nut 34 is provided at each extension whereby the adjacent casing portion is secured to the frame 12 by being clamped against the nuts 31, which space the casing portions 32 and 33 axially from the plates 22 and 23 respectively. The casing portions 32 and 33 are large enough in diameter to permit the provision of an air space between the same and the field core 10 and frame 12. Each casing portion is also provided in its end face with suitable ventilating openings 35, and a centrally disposed opening 36, through which the bearing bosses 24 may extend.

The brush holders 14 and 15 are identically formed, each comprising a strip of material U-shaped in cross-section and having opposed arm portions 37 and 38, connected by a base portion 39. This U-shaped part is disposed with the open end thereof facing the inner face of plate 22 and is secured thereto by means of an extension 40 of arm 37, which is disposed along the inner face of plate 22 and is preferably spot welded thereto. The other arm 38 is free at its end which is adjacent the plate 22. A metallic brush receiving tube 41, wrapped or covered with suitable insulating material 42, is disposed between the arm portions 37 and 38 of the brush holder and against the base portion 39. A bolt 43, that passes through arm portions 37 and 38, when tightened draws arm portion 38 towards arm portion 37 to clamp the tube 41 therebetween. The bolt 43 is so disposed in respect to the base portion 39 that it prevents movement of the covered tube 41 away from the base portion 39 and out of operable position with respect to the commutator 18.

The tube 41 is provided at its outer end with perforations 44 and 45, that are disposed in opposite sides of the tube and in alignment. The brush 16 or 17 is inserted in the tube 41 and spring 46 inserted, and a disk of insulating material 47 is placed over the end of the spring. A pin 48 passed through the perforations 44 and 45, retains the disk 47, spring 46 and the associated brush against outward movement whereby the brush is forced toward the commutator 18 by the action of the spring.

The wire terminals leading to the brushes in motors of this type may be soldered directly to the tube at its outer end, but preferably a strip of metallic material 50 is disposed beneath the insulating covering 42, in contact with the tube 41. The strip 50 is provided with a tab 51, extended at right angles thereto. A perforation 52 in the tab 51, permits the insertion of a terminal wire 53 therein, which when soldered to the tab is assured a good electrical contact therewith. Clamping of the tube 41 between the arm portions 37 and 38, by bolt 43, also clamps the strip 50 against the side of the tube adjacent thereto, it being preferably disposed adjacent the side of the tube that is adjacent either portion 37 or 38 for this purpose.

The provision of a supporting frame of the improved structure shown, insures rigidity and accuracy in the assembly of the armature and field relatively to each other. Perfect alignment of the bearings 20 and 21 is obtained and maintained insuring accurate positioning of the armature and field core in respect to each other, both axially and laterally, whereby efficient and quiet operation is assured. Axial adjustments may be made between the armature and field during the assembly thereof by varying the length of sleeves 25 and 26, to compensate for slight differences or variations in dimensions that may occur during the manufacture of these parts.

The motor unit comprising the armature 11, core 10 and frame 12 is complete and operable in itself and may be operated for testing purposes independently of any other part to which it may be subsequently assembled. The casing 13 provides a complete and efficient enclosure for the parts of this motor unit, that is readily removable without disturbing any of the parts of the motor unit and which, when in position about the unit, is suitably spaced from the parts thereof to permit free circulation of air thereabout for efficient ventilation thereof. Not being directly connected to any of the movable parts that may, during operation, become heated, the casing remains cool and, therefore, is not uncomfortable to handle.

The improved brush holders are particularly of efficient and rigid structure. Adjustment of the spring tension and of the brushes toward and away from the commutator may be readily made, after loosening the bolt 43, by sliding the brush receiving tube 41 in the direction desired. In like manner, removal of these parts is permitted for replacement or repair and without disturbing the soldered connection between the conductor leads 53 and strips 50, the latter being readily slipped out from engagement with the tube 41 whenever the bolt 43 is loosened.

While I have shown and described a preferred embodiment of my invention, it will be understood that it is not to be limited to the details shown but is capable of modification and variation within the spirit of the invention and the scope of the appended claims.

What I claim is:

1. In an electric motor having a field core, a rotor and a commutator, bearing plates axially spaced from said field core and supported therefrom in position to operatively support said rotor relatively to said core, brush holders on one of said plates, each of said brush holders comprising a strip of material forming a member U-shaped in cross-section and disposed with an open end thereof facing said plate, each member including a pair of spaced arms, one arm of each member being secured to said plate and the other arm being free, brush receiving tubes disposed between the aforesaid arms and against the bases of said members, insulating material between said tubes and members, and means to clamp said tubes between said arms.

2. In an electric motor having a field core, a rotor and a commutator, bearing plates axially spaced from said field core and supported therefrom in position to operatively support said rotor relatively to said core, brush holders on one of said plates, each of said brush holders comprising a strip of material forming a member U-shaped in cross-section and disposed with the open end thereof facing said plate, said members including a pair of spaced arms, one arm of each of said members being secured to said plate and the other arm being free, a brush receiving tube disposed between the aforesaid arms and against the base of said U-shape, insulating material between said tubes and members, and bolts passing through said arms to draw the arms having the free ends toward the other arms to clamp said tubes between said arms.

3. In an electric motor having a field core, a rotor and a commutator, bearing plates axially spaced from said field core and supported therefrom in position to operatively support said rotor relatively to said core, brush holders on one of said plates, each of said brush holders comprising a strip of material forming a member U-shaped in cross-section and disposed with the open end thereof facing said plate, said members including a pair of spaced arms, one arm of each member being secured to said plate and the other arm being free, a brush receiving tube disposed between the aforesaid arms and against the base of said U-shape, a bolt passing through both of said arms to draw the arm having the free end toward the other arm to clamp said tube between said arms, said bolt being disposed in respect to the base of said U-shape to prevent movement of said tube away therefrom.

4. In an electric motor having a field core, a rotor and a commutator, bearing plates axially spaced from said field core and supported therefrom in position to operatively support said rotor relatively to said core, brush holders on one of said plates, each of said brush holders comprising a strip of material forming a member U-shaped in cross-section and disposed with the open end thereof facing said plate, said members including a pair of spaced arms, one arm of each member being secured to said plate and the other arm being free, a brush receiving tube disposed between the aforesaid arms and against the base of said U-shape, a lead connecting strip adjacent said tube in contact therewith and disposed between said arms, and means to clamp said tube between said arms and said lead connecting strip against said tube.

5. In an electric motor having a field core, a rotor and a commutator, bearing plates axially spaced from said field core and supported therefrom in position to operatively support said rotor relatively to said core, brush holders on one of said plates to operatively position brushes in respect to said commutator, each of said brush holders comprising a strip of material forming a member U-shaped in cross-section and disposed with the open end thereof facing said plate, each of said U-shaped members including a pair of spaced arms, one arm of each of said U-shaped members being secured to said plate and the other arm being free, brush receiving tubes disposed between the aforesaid arms and against the bases of said U-shaped members, insulating material between said tubes and U-shaped members, lead connecting strips adjacent said tubes in contact therewith and disposed between said arms, and means to clamp said tubes between said arms and said lead connecting strips against said tubes, said means comprising bolts passing through said arms and adapted to draw the arms having the free ends toward the other arms.

6. In an electric motor having a commutator, a pair of brush holders, each of said brush holders being U-shaped in cross-section and including a pair of spaced arms, one arm being fixed to a stationary part of said motor, and the other arm being free to move toward and away from the fixed arm, a brush holding tube disposed between said arms, and means to draw said free arm towards said fixed arm to clamp said tube therebetween.

7. In an electric motor having a commutator, a pair of brush-holders, each of said brush-holders being U-shaped in cross-section and including a pair of spaced arms, one arm of said holder being fixed to a stationary part of said motor and the other arm being free to move toward and away from the fixed arm, a brush holding tube disposed between said arms, a lead connecting strip in contact with said tube and disposed between said arms, and means to draw said free arm towards said fixed arm to clamp said tube therebetween and to press said lead connecting strip against said tube.

8. In an electric motor having a commutator, brush holding means comprising a U-shaped member, a tube-like brush receiving member embraced by the U-shaped member, insulating material between said U-shaped member and said tube-like member, and means to draw two of the opposite sides of said U-shaped member together to clamp said tube-like member therebetween.

9. In an electric motor having a commutator, brush holding means comprising a U-shaped member, a tube-like brush receiving member embraced by the U-shaped member, insulating material between said U-shaped member and said tube-like member, a lead connecting strip adjacent said tube-like member and in contact therewith, and means to clamp said tube-like member in said U-shaped member and to retain said lead connecting strip in contact with said tube-like member.

10. In an electric motor having a commutator, brush holding means comprising a U-shaped member, a tube-like member embraced by said U-shaped member, a brush slidably mounted in said tube-like member, means on said U-shaped member for connecting said brush holding means to a part of said motor and to retain the same in fixed position in respect to said commutator, and means to close said U-shaped member and to clamp said tube-like member between the arms of the U-shaped member.

11. In an electric motor, a rotor having a shaft, a field core about said rotor, spaced apart rotor shaft bearing supporting plates one on either side of said field core, cup-shaped casing parts disposed about the aforesaid parts and with the open end of one facing the open end of the other, tie rods passing through said field core, both of said supporting plates and both of said casing parts to support the same, means on said tie rods between each of said plates and said field core to axially space them apart, means on said tie rods between each of said plates and the adjacent casing part to axially space them apart and to secure said plates on said rods, and means cooperating with each end of each tie rod to secure the adjacent casing part thereto.

12. In an electric motor, a rotor having a shaft, a field core about said rotor, spaced apart rotor shaft bearing supporting plates one on either side of said field core, cup-shaped casing parts disposed about the aforesaid parts and with the open end of one facing the open end of the other, tie rods passing through said field core, both of said supporting plates and both of said casing parts to support the same, means on said tie rods between each of said plates and said field core to axially space them apart, means on said tie rods between each of said plates and the adjacent casing part to axially space them apart and threadingly engaging said tie rods to secure said plates thereto, and means threadingly engaging each end of each tie rod to secure the adjacent casing part thereto.

13. In an electric motor having a commutator, brush-holding means comprising a U-shaped member, a tube-like brush receiving member embraced by the U-shaped member, and means to draw opposite sides of said U-shaped member together to clamp said tube-like member therebetween.

14. In an electric motor having a commutator, brush-holding means comprising a U-shaped member, a tube-like brush receiving member embraced by the U-shaped member, and means to draw opposite sides of said U-shaped member together to clamp said tube-like member therebetween, said means being disposed in respect to another side of said U-shaped member to prevent movement of said tube-like member away therefrom.

15. In an electric motor having a commutator, brush-holding means comprising a U-shaped member, a tube-like brush receiving member embraced by the U-shaped member, and means to draw opposite sides of said U-shaped member together to clamp said tube-like member therebetween, and a member extending from one of the sides of said U-shaped member for attaching said member to a stationary part of said motor.

ALFRED C. GILBERT.